Patented Apr. 4, 1939

2,153,115

UNITED STATES PATENT OFFICE 2,153,115

PROCESS OF PREPARING ACETYLENE

Robert E. Burk, Cleveland, Ohio, assignor to The Standard Oil Company, Cleveland, Ohio, a corporation of Ohio No Drawing. Application August 28, 1937, Serial No. 161,473

6 Claims. (Cl. 260—679)

In obtaining acetylene from mixed sources of such gas in association with other gases, it is a well known procedure to scrub the gas with acetone to dissolve the acetylene. This procedure however is subject to a very serious disadvantage that the acetone has such a high vapor pressure as to incur expensive losses in the process, and attempt to avoid such losses with such agent necessitates recourse to particularly expensive equipment. I have now found however that acetylene can be prepared in a particularly effective manner, making possible relatively simple procedure which is free from undue expense.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Acetylene is obtained or produced in desired manner, for instance by suitably cracking hydrocarbon material, a feasible procedure involving the subjecting of hydrocarbons of the methane series, to cracking in an electric arc furnace. The gaseous mixture containing acetylene and other gases varying in accordance with the precise conditions which have preceded, is then subjected to the action of a polyketone. For this, I prefer a diketone. Alpha, beta and gamma diketones may be employed, having the properties of affinity for acetylene together with merely slight polymerizing tendency. Diketones having one or more methyl groups or hydrogen atoms substituted by alkyl, aryl, halogen substituted alkyl and aryl groups, etc. may be employed. Compounds of suitable affinity for acetylene and low polymerizing tendency if of relatively high melting point may be employed in mixture with compounds of lower melting point or solvents. In substitution groups as above-mentioned, it is in general advisable to avoid compounds in which carbon double bonds occur conjugated with the carbonyl groups. Some of the alpha diketones have a notably slight tendency to polymerize, and are directly applicable. The polymerizing tendency of beta diketones is reduced particularly also by substitution of the alpha hydrogen atoms. In all cases, a suitably low polymerizing tendency may be had in the compounds employed, and where desired such tendency may be assured by admixture of poly-phenols and equivalent agents inhibiting polymerization.

Instances of diones applicable are the alpha diketone, diacetyl, or butane dione, $CH_3CO.CO.CH_3$, also derivatives thereof in which one or both methyl groups are replaced by other alkyl or aryl groups, as benzyl, $C_6H_5CO.CO.C_6H_5$; also such beta diketones as pentane dione 2,4, $CH_3CO.CH_2.CO.CH_3$, and derivatives in which hydrogen is substituted, particularly hydrogens of the $CH_2$ group; also gamma diketones, such as hexane dione 2,5, $CH_3.CO.CH_2.CH_2.CO.CH_3$, and derivatives having hydrogen substituted by alkyl, aryl, halogen substituted alkyl and aryl groups, etc.

The treatment of the acetylene mixture with the dione is desirably carried out at ordinary temperature, although lower temperatures may be used, and slightly higher temperatures. The acetylene is taken up selectively by the dione, and finally by heating the dione the acetylene is driven off and collected.

As an example: An acetylene-containing gaseous mixture, for instance from pyrolyzing hydrocarbons at high temperature, is subjected to contact exposure to pentane dione 2,4, at the temperature of 30° C. and 750 mm. pressure. The acetylene is taken up thereby, about seven and a half volumes to each volume, and other gases pass on unchanged.

Other modes of applying the principle of the invention may be employed, change being made as regards the details described, provided the features stated in any of the following claims, or the equivalent of such, be employed.

I therefore particularly point out and distinctly claim as my invention:

1. A process of the character described, which comprises selectively taking up acetylene from an acetylene-containing gas by subjecting the latter to pentane dione 2,4, and subsequently separating the acetylene therefrom.

2. A process of the character described, which comprises selectively taking up acetylene from an acetylene-containing gas by subjecting the latter to hexane dione 2,5, and subsequently separating the acetylene therefrom.

3. A process of the character described, which comprises selectively taking up acetylene from an acetylene-containing gas by subjecting the latter to butane dione.

4. A process of the character described, which comprises selectively taking up acetylene from an acetylene-containing gas by subjecting the latter to a diketone and poly-phenol.

5. A process of the character described, which comprises selectively taking up acetylene from an acetylene-containing gas by subjecting the latter to a dione of slight polymerizing tendency.

6. A process of the character described, which comprises selectively taking up acetylene from an acetylene-containing gas by subjecting the latter to a polyketone guarded against polymerization.

ROBERT E. BURK.